(12) United States Patent
Moquin et al.

(10) Patent No.: US 7,394,366 B2
(45) Date of Patent: Jul. 1, 2008

(54) METHOD OF DETECTING AUDIO/VIDEO DEVICES WITHIN A ROOM

(75) Inventors: Philippe Moquin, Kanata (CA); Stephane Dedieu, Ottawa (CA)

(73) Assignee: Mitel Networks Corporation, Kanata, Ontario (CA)

( * ) Notice: Subject to any disclaimer, the term of this patent is extended or adjusted under 35 U.S.C. 154(b) by 199 days.

(21) Appl. No.: 11/272,814

(22) Filed: Nov. 15, 2005

(65) Prior Publication Data

US 2007/0112942 A1    May 17, 2007

(51) Int. Cl.
*G08B 21/00* (2006.01)
(52) U.S. Cl. .................. 340/540; 340/686.6; 340/692; 340/693.6; 340/5.8; 340/825.49; 340/10.42; 340/7.21
(58) Field of Classification Search .......... 340/540, 340/686.6, 692, 693.6, 5.8, 825.49, 10.42, 340/7.21
See application file for complete search history.

(56) References Cited

U.S. PATENT DOCUMENTS

| | | | |
|---|---|---|---|
| 3,076,519 A * | 2/1963 | Alsabrook | 367/2 |
| 4,399,556 A * | 8/1983 | Whidden | 455/67.12 |
| 4,751,689 A * | 6/1988 | Kobayashi | 367/127 |
| 5,493,283 A | 2/1996 | Hopper et al. | |
| 5,793,630 A | 8/1998 | Theimer et al. | |
| 6,697,018 B2 | 2/2004 | Stewart | |
| 6,720,922 B2 | 4/2004 | Williams et al. | |
| 6,799,047 B1 | 9/2004 | Bahl et al. | |
| 6,931,442 B1 | 8/2005 | Hamanaka | |
| 2001/0056466 A1 | 12/2001 | Thompson et al. | |
| 2002/0101918 A1* | 8/2002 | Rodman et al. | 375/224 |
| 2004/0003098 A1 | 1/2004 | Coffy | |
| 2005/0097618 A1 | 5/2005 | Arling et al. | |
| 2005/0136845 A1 | 6/2005 | Masuoka et al. | |
| 2005/0140779 A1 | 6/2005 | Schulz et al. | |

(Continued)

FOREIGN PATENT DOCUMENTS

EP    1107512    6/2001

(Continued)

OTHER PUBLICATIONS

A. Harter et al., "The Anatomy of a Context-Aware Application," Proc. 5th Ann. Int'l Conf. Mobile Computing and Networking (Mobicom 99), ACM Press, New York, 1999, pp. 59-68.

(Continued)

*Primary Examiner*—Tai T. Nguyen
(74) *Attorney, Agent, or Firm*—Michelle Whittington, Esq.

(57) ABSTRACT

A system and method for automatic identification and integration of audio/visual devices in a room for multi-media conferencing operation. Each device includes a circuit that periodically emits a signal that is recognized by another device. Upon receiving the signal, the other devices respond with information relating to how they can inter-communicate with each other over one or more networks they are connected to. An ad-hoc conferencing network is established between the integrated devices, such that the quality of multi-media conferencing is improved through the use of all the available devices within a room. The signal is preferably one that is confined to a room, and a specific protocol can be implemented to manage the exchange of information between the devices.

21 Claims, 4 Drawing Sheets

U.S. PATENT DOCUMENTS

| | | |
|---|---|---|
| 2005/0145688 A1 | 7/2005 | Milenkovic et al. |
| 2005/0159823 A1 | 7/2005 | Hayes et al. |
| 2006/0136544 A1* | 6/2006 | Atsmon et al. .............. 709/200 |

FOREIGN PATENT DOCUMENTS

| | | |
|---|---|---|
| EP | 1107516 | 6/2001 |
| WO | 2004/014038 | 2/2004 |

OTHER PUBLICATIONS

N.B. Priyantha, A. Chakraborty, and H. Balakrishnan, "The Cricket Location-Support System," Proc. 6th Ann. Int'l Conf. Mobile Computing and Networking (Mobicon 00), ACM Press, New York, 2000, pp. 32-43k, the "Dolphin".

Y. Fukuju et al, "DOLPHIN: An Autonomous Indoor Positioning System in Ubiquitous Computing Environment," IEEE Workshop on Software Technologies for Future Embedded Systems, pp. 53-56, May 2003.

Mandal et al., "Beep: 3D Indoor Positioning Using Audible Sound." Proc. IEEE Consumer Communications and Networking Conference (CCNC'05), Las Vegas, Jan. 2005.

* cited by examiner

METHOD OF DETECTING AUDIO/VIDEO DEVICES WITHIN A ROOM

FIELD OF THE INVENTION

The present invention relates to a conference system with microphones that are not necessarily located at a fixed location with respect to the loudspeaker.

BACKGROUND OF THE INVENTION

The problem of sound pick up in a large room is typically accomplished by the use of multiple, directional microphones. In such instances a fixed installation or a main unit with wired auxiliary microphones is used. The possibility of providing an ad-hoc variety of audio devices within a room is only possible with significant user interaction. With the advent of wireless conference units the addition of wired auxiliary units becomes problematic.

With the advent of IP networks for multimedia it now becomes possible to have audio and video devices that work together in the same room. Again providing ad-hoc set-ups with minimal user interaction is desirable.

One method of providing for the use of several devices in the same room is to use some automatic detection scheme. Hopper et al. U.S. Pat. No. 5,493,283 suggests using an array of fixed infrared transponders that would automatically detect an infrared badge on the mobile user. Given that infrared light is generally confined to a room, this scheme allows location of all the mobile badges within the same room. However, the badges themselves are not capable of network communication with each other, nor do they interact any further with the fixed transponders.

Active Bat (1) proposed by Harter et al. (A. Harter et al., "The Anatomy of a Context-Aware Application," Proc. 5th Ann. Int'l Conf. Mobile Computing and Networking (Mobicom 99), ACM Press, New York, 1999, pp. 59-68) discloses a similar application to Hopper et al., but uses mobile units (BATS) that respond to an RF signal by emitting an ultrasonic pulse. A base station periodically transmits a radio message containing a single identifier, causing the corresponding BAT to emit a short unencoded pulse of ultrasound.

Radio means have also been proposed, as the infrastructure is generally available. Some examples are Coffy in United States Patent publication no. 2004/003098, Williams and Needham U.S. Pat. No. 6,720,922, Stewart in U.S. Pat. No. 6,697,018 or Bahl et al in U.S. Pat. No. 6,799,047. These all require an array of fixed transponders with known locations. In order to use the radio frequency schemes to determine if two devices are within the same room, one must determine the distance between the mobile device and the fixed transponder. Using this information and a detailed floor plan one can then determine if a mobile user is within a certain room and if two devices are within the same room. Obviously this requires a great deal of user information to be entered in a database thus defeating the ad-hoc nature of the set-up.

To overcome this hybrid schemes have been proposed such as the "Cricket" locating scheme by N. B. Priyantha, A. Chakraborty, and H. Balakrishnan, "The Cricket Location-support System," Proc. 6th Ann. Int'l Conf. Mobile Computing and Networking (Mobicom 00), ACM Press, New York, 2000, pp. 302-43k, the "Dolphin" scheme by Y. Fukuju et al, "DOLPHIN: An Autonomous Indoor Positioning System in Ubiquitous Computing Environment," IEEE Workshop on Software Technologies for Future Embedded Systems, pp. 53-56, May 2003, the "Beep" scheme by Mandal et al. , "Beep: 3D Indoor Positioning Using Audible Sound." Proc. IEEE Consumer Communications and Networking Conference (CCNC'05), Las Vegas, January 2005, as well as Rodman in United States Patent publication no. 2002/0101918. In these a radio frequency and audio system are combined. The basis of these is that the radio frequency part synchronizes and provides a control structure to the location of the mobile device. The acoustic signal is then used to determine the actual location of the device. Since building elements (walls, floors, ceiling and windows) are generally opaque to high frequency sound this easily allows one to locate users within the same room. Except for Rodman these schemes all require a fixed array of transponders and thus suffer from the same infrastructure costs of Hopper's infrared Active badge and the ultrasonic Active Bat.

Rodman teaches a more ad-hoc system by augmenting an existing radio frequency linked device with an acoustic discrimination analysis scheme to determine if two devices are within the same room. The audio signal must be sampled concurrently, converted to a digital representation, this digital data be transmitted via radio frequency to the location of the signal analysis processor where the data from the pair of devices is analyzed by the said processor. A discrimination analysis is performed which enables one to determine if the pair of signals is within the same room thus indicating that the devices are within the same room. However, this scheme requires a dedicated radio frequency link for the transport of the digitized audio signals and synchronization of the sampling. It thus cannot operate without this element. Furthermore it requires a "signal analysis processor". In most radio frequency unlicensed bands, the devices used require pairing to achieve the level of density and security required. This is very difficult to do if the devices are not in the same room so the usefulness of Rodman's scheme in a real system seems to be to detect if one has left the room and to do so requires quite an expensive audio device.

SUMMARY OF THE INVENTION

According to the present invention there is provided method of an in-room wireless communication between the various loudspeaker units, speakerphones, microphones, video devices, etc. that permit mutual recognition, and relative location, permitting collaborative behaviour to enhance the audio and video quality.

In a first aspect, the present invention provides a method for wirelessly detecting a second device with a first device in a room. The method includes emitting a signal confined to the room from the first device; receiving a reply signal confined to the room from the second device in response to the emitted signal; and registering the second device in response to receiving the reply signal from the first device. In embodiments of the present aspect, the method further includes a step of monitoring the room for a predetermined period of time before the step of emitting, and the step of emitting can include emitting the signal at regular intervals. The step of receiving can include detecting the signal by the second device, where the second device emits the reply at delayed time after detecting the signal.

The devices ideally would all share some common network through which the signals between the devices can be shared. In the preferred embodiment this is Ethernet but a similar behaviour can be obtained using traditional telephony, ISDN, DECT, Blue Tooth, GSM, etc. networks. The devices are provided with the capability of communicating wirelessly between each other by the use of ultra-sound, an infra-red (IR) link or some other such medium that can be confined to a room. In the preferred embodiment the ultra-sound method is retained because of cost and interference benefits. The signal and the reply signal can include ultra-sound signals generated in a 30-34 kHz frequency range. Alternately, the signal and the reply signal can include infrared signals.

In another embodiment of the present aspect, the method further includes a step of requesting a network address of the second device by the first device after the step of registering, and emitting the network address by the second device in response to the step of requesting. The step of requesting the network address can include emitting an address request signal confined to the room by the first device, and the step of emitting the network address can include emitting an address signal confined to the room by the second device. In a further embodiments, the reply signal can include a network address corresponding to the second device, and network communication can be established between the first device and the second device. In yet another embodiment, the step of receiving can include receiving a second reply signal from a third device, and the reply signal can include a symbol corresponding to an order of the second device, where the second reply signal can include a second symbol corresponding to an order of the third device relative to the second device. The third device can provide the symbol corresponding to the order of the second device when the second device is removed from the room or deactivated. The second reply signal can include a second network address corresponding to the third device, and the second network address can be received by the at least one device, such that network communication between the first device, the second device, and the third device can be established.

In another embodiment of the present aspect, the third device can emit a second reply at the delayed time after detecting the signal, and a collision between the second device and the third device can be detected. In response to the detected collision, the second device and the third device will reply at randomly determined delayed times.

In a second aspect, the present invention provides an ultra-sound processing circuit for a device having a speaker assembly and a microphone assembly. The ultra-sound processing circuit can include a signal generator, an upconversion circuit, a downconversion circuit, a signal detector, and a microcontroller. The signal generator provides an output signal in response to microcontroller data. The upconversion circuit modulates the output signal with a frequency carrier, the modulated output signal being provided to the speaker assembly for generating an output ultra-sound signal. The downconversion circuit receives an input ultra-sound signal from the microphone assembly and demodulates the input ultra-sound signal into an input signal. The signal detector decodes the input signal and provides corresponding input data. The microcontroller provides microcontroller data to the signal generator and receives the input data from the signal decoder.

According to an embodiment of the present aspect, the signal generator can include a dual-tone multifrequency (DTMF) generator, and the signal detector can include a DTMF signal detector.

The invention consists of providing each device with a means for wireless intercommunication as noted above. Each device periodically emits a signal that can be recognised by any other device that shares this capability. Once more than one device is detected in the same room the devices indicate to each other how they can communicate effectively over the common network by exchanging an address (e.g. IP, telephone number). Once this is established they are able to operate collaboratively within the same space. The user does not need to provide any intervention. If a device is disconnected then its periodic signal emission stops and the other device(s) can reconfigure themselves. Similarly, once a new device is connected it can be added on to the collaborative. If the devices are in a room that can be partitioned then as the partitions are moved the systems can adapt automatically to the room configuration (e.g. large hotel ballrooms that can be sub-divided into meeting rooms).

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

A system and method for automatic identification and integration of audio/visual devices in a room for multi-media conferencing operation. Each device includes a circuit that periodically emits a signal that is recognized by another device. Upon receiving the signal, the other devices respond with information relating to how they can inter-communicate with each other over one or more networks they are connected to. An ad-hoc conferencing network is established between the integrated devices, such that the quality of multi-media conferencing is improved through the use of all the available devices within a room. The signal is preferably one that is confined to a room, and a specific protocol can be implemented to manage the exchange of information between the devices.

The embodiments of the present invention solves shortcomings of the prior art by allowing a truly ad-hoc set-up where any of the participants can identify the others. It requires no fixed array of transponders, no known floor plan and allows the use of various carrier networks as well as a heterogeneous network (e.g. ISDN, DECT and VoIP devices). The described invention does not require any user intervention to discover the various devices within the same room, and provides a method by which multiple units within a room can be identified to a central point or to each other, so that they can all be used to improve the audio and video performance within the room. They need not be identical devices and they can be connected to different ports of a network. The devices can be activated at will by the user and with minimal user intervention to work together collaboratively.

Figure 1:
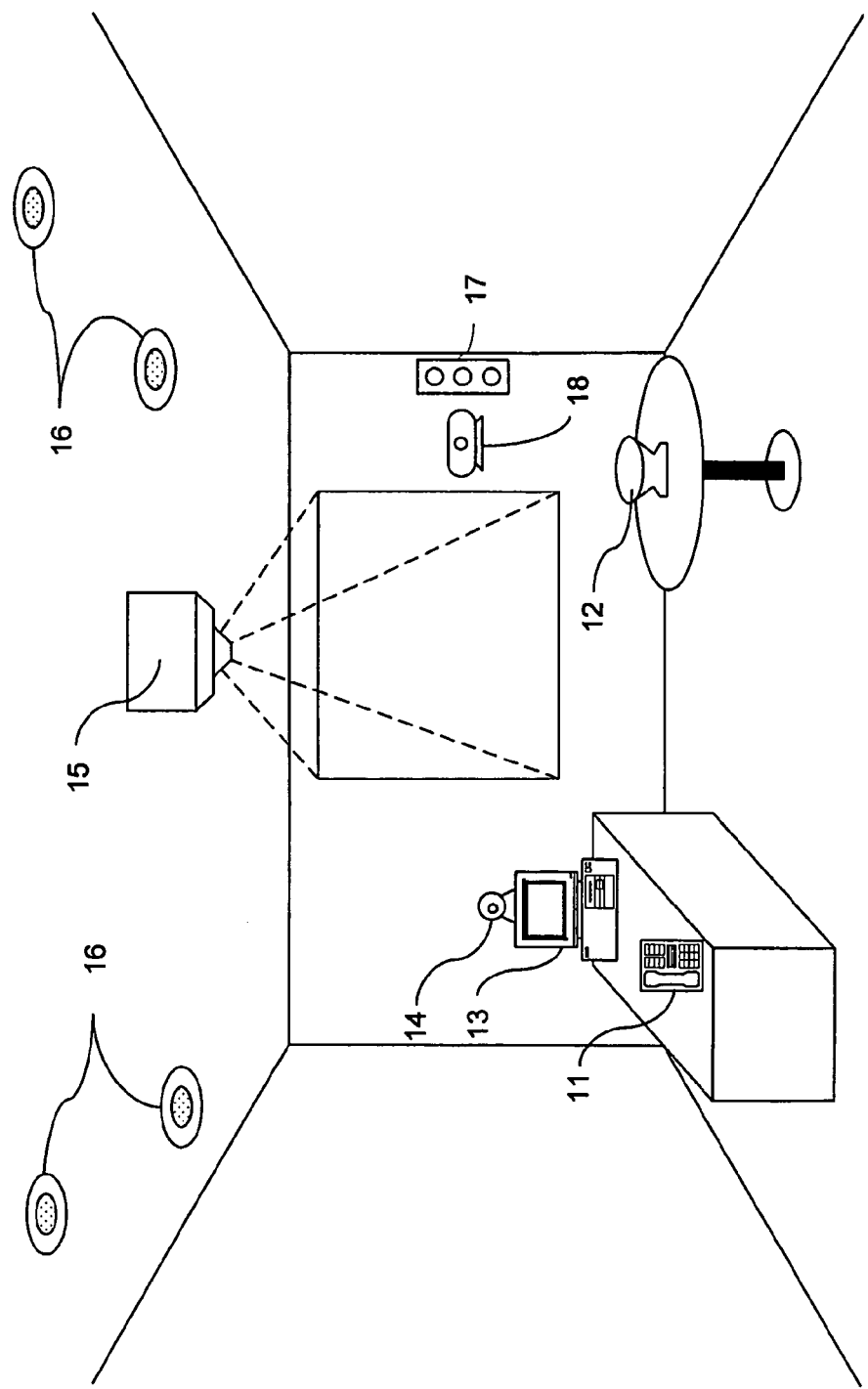
FIG. 1 is a drawing of a room with various multimedia devices.

FIG. 1 illustrates the audio/visual devices that can be expected to be found in a contemporary executive office or meeting room: a telephone (with speakerphone) 11, an audio conferencing unit 12, a personal computer 13 with a video camera 14, a ceiling mounted video projector 15, a fixed installation audio system 16, a microphone array 17 mounted on a wall, and a video-conferencing unit camera 18.

The embodiments of the present invention employ a confined signal channel, relatively free of interference, for a signal that can be confined to a room. The devices within this room can use this signal channel to discover their mutual existence, and thus can collaborate without user intervention.

For example, audio and light wave signals work well as they are physically confined within typical room.

Infrared light is one possible carrier, but suffers from interference from natural light and some electrical lighting devices. Audible sound can be used, but is audible and therefore evident to the user. Infrasound is difficult to generate and travels through walls. Accordingly, while these types of signal carriers can be used in embodiments of the present invention, ultra-sound is a type of carrier that is preferably used in the described embodiments of the present invention. Any person skilled in the art will easily understand that the aforementioned signals are not an exhaustive list of possible signal carriers that can be employed.

The first aspect of this preferred embodiment is to select a signal space that is relatively uncluttered. The actual characteristics of the background noise influences the type of signal used and one skilled in the art will choose an appropriate signal. In the preferred embodiment, the 30 kHz to 34 kHz band will be used with a multi-frequency sinusoidal signal for ease of implementation.

Figure 2:
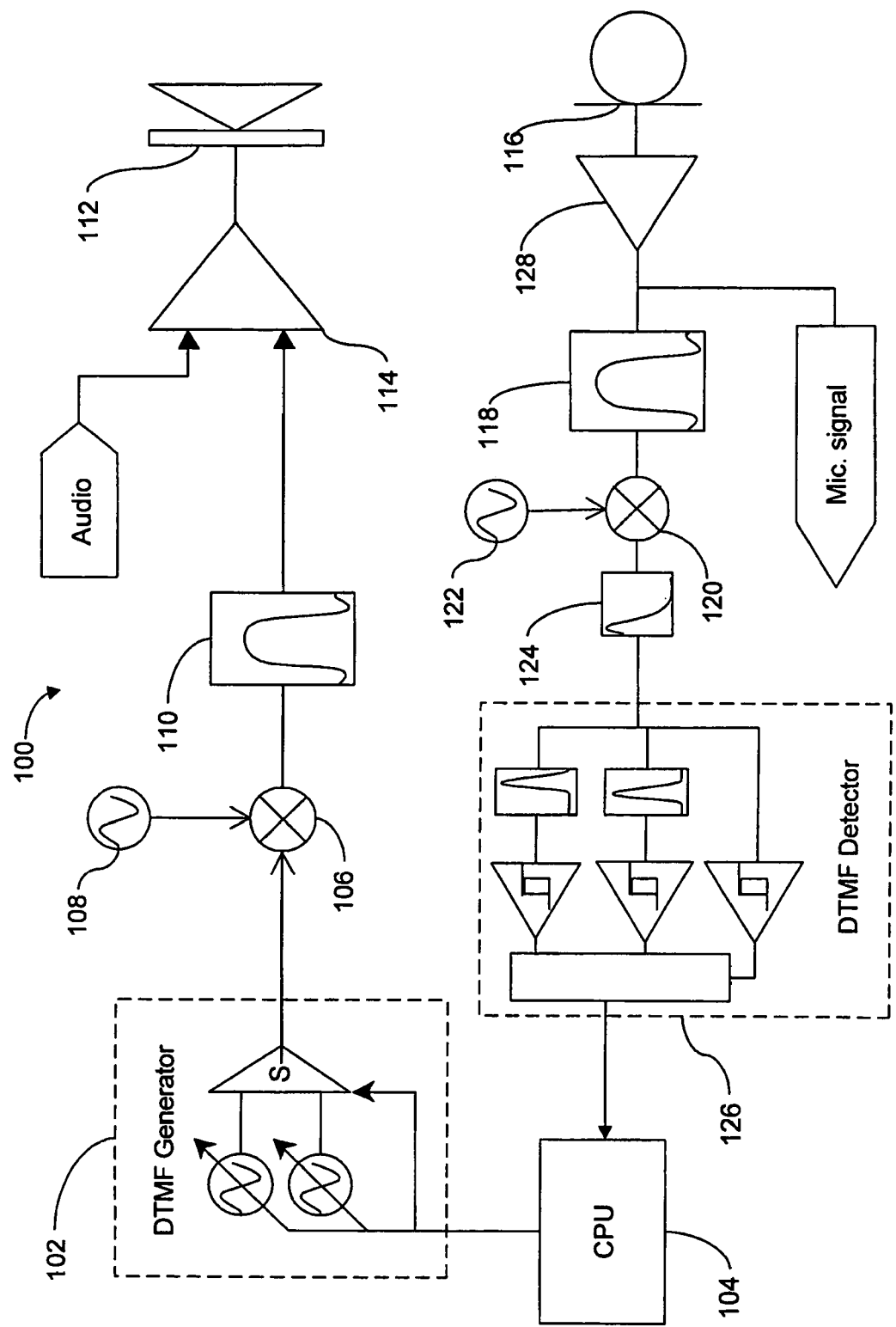
FIG. 2 is a functional block diagram of an ultra-sound signal-processing circuit according to an embodiment of the invention.

The audio/visual devices noted in FIG. 1 preferably include an ultra-sound processing circuit for sending and receiving ultra-sound signals. A functional block diagram of an ultra-sound processing circuit 100 is shown in FIG. 2. Ultra-sound processing circuit 100 includes a signal generation block 102 controlled by a microcontroller 104 of the audio/visual device for providing an output ultra-sound signal in response to data from microcontroller 104. As previously mentioned, any arbitrary signal could be generated but a Dual-tone multifrequency generator (DTMF) is used in the preferred embodiment, as it is readily available in typical telephony products. The signal is then frequency modulated by the carrier frequency Fc by the mixer 106 and the carrier frequency generator 108 to provide a modulated output ultra-sound signal. A band-pass filter 110 ensures that only the desired signal is broadcast by the loudspeaker 112 via power amplifier 114. Amplitude modulation can also be used, but is less reliable than frequency modulation for ultrasonic propagation in a room. The microcontroller 104 modulates the ultra-sound signal so that it is generated for a time period long enough for reliable detection of the signal by any receiver within the room. Power amplifier 114 can also receive an audio signal to be broadcast during normal operation, such as the speakerphone function.

Microphone 116 captures input ultra-sound signals, which is amplified by amplifier 128 to a usable signal level. The first band-pass filter 118 extracts the frequency band of interest and rejects other signals that could interfere with the reliable detection of the desired signal. The signal is then down converted to base band by down-conversion mixer 120 with carrier frequency Fc provided by generator 122. The resulting input signal, also known as a baseband signal, is then fed to filter 124. The base band signal is detected at DTMF signal detector 126, which decodes the input signal into input data. The input data is then communicated to the microcontroller 104. One skilled in the art will recognize that this is simply a reliable signal generation and detection scheme. There are various such schemes and such variations are expected to be within the realm of this disclosure. It is noted that the output of amplifier 128 can be provided to the audio/video device for transmission of an audio signal during normal operation, such as the speakerphone function.

The previously described embodiment of the ultra-sound processing circuit 100 should be understood as a generic functional embodiment, which can be implemented with in the analog or digital domains. Examples of analog and digital implementations of the present invention are shown in FIG. 3 and FIG. 4 respectively.

Figure 3:
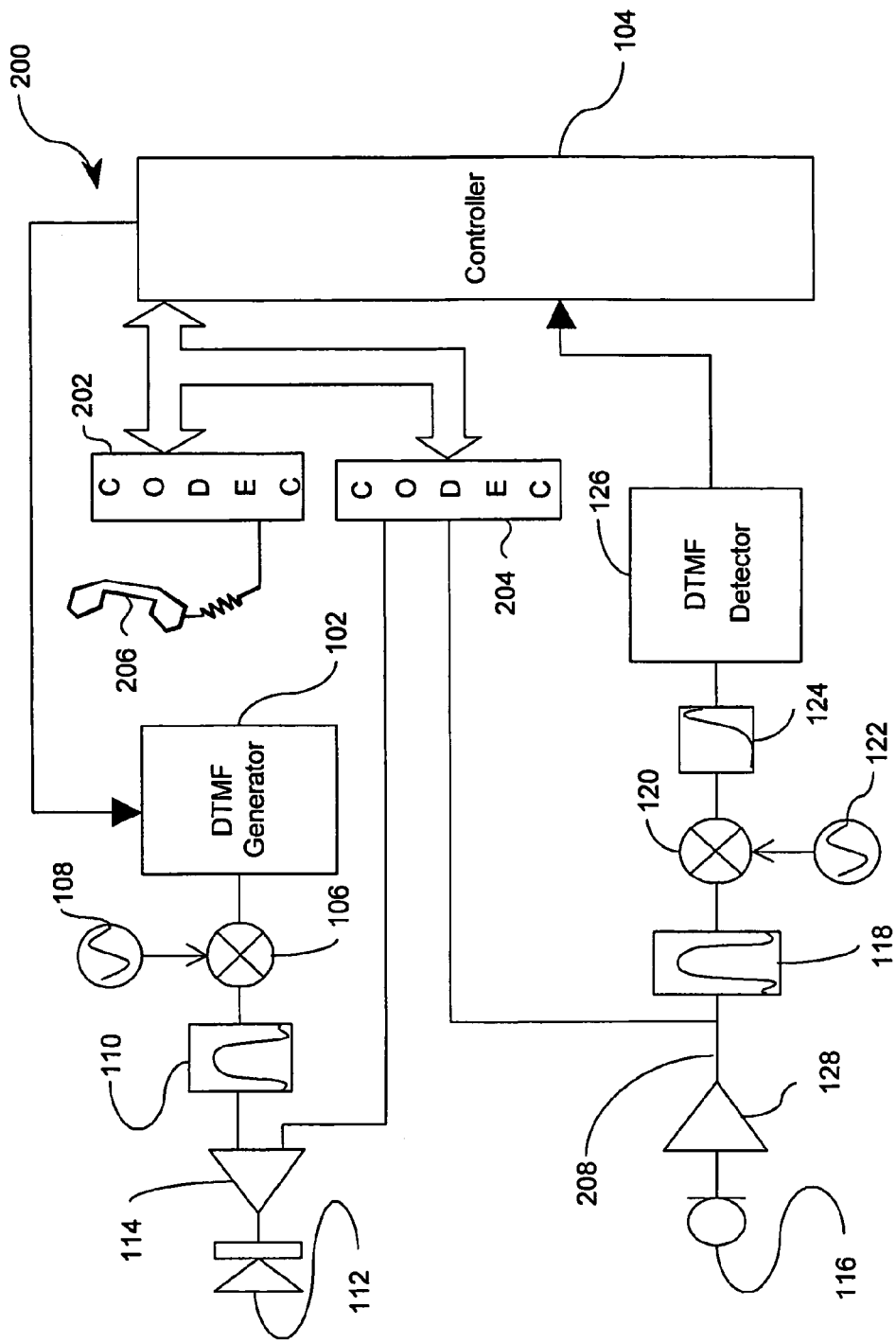
FIG. 3 is a block diagram of a speakerphone according to an embodiment of the present invention; and, FIG. 4 is a block diagram of a speakerphone according to another embodiment of the present invention.

FIG. 3 is a block diagram of a speakerphone 200 according to an embodiment of the present invention. Standard components of the speakerphone include microcontroller 104, handset CODEC 202, speaker CODEC 204 and handset 206. Although not shown in FIG. 3, components such as the display and keyboard user interfaces would be understood to be included as part of the speakerphone 200. More specifically, FIG. 3 illustrates an analog implementation of the ultra-sound processing circuit 100. In this embodiment the transducers, which include microphone 116 and loudspeaker 112, are selected to generate appropriate audible signals but are also capable of reproducing the ultrasonic signals in the chosen band. The power amplifier 114 has an extra input for the ultrasonic signal that is generated by an oscillator, such as DTMF generator 102 under control of the telephone microcontroller 104. The power amplifier 114 is only slightly modified from typical implementations to allow it to have a frequency response that extends to 34 kHz. Such modifications can be implemented by those of skill in the art, and alternately, may be commercially available for substitution. For example, most touch tone telephones can be modified to use their existing DTMF generator, or other existing tonality generating devices.

The microphone signal 208 is split between the typical telephone input and a detector circuit, such as DTMF detector 126. The single side-band downconverter circuit consisting of previously described components 118, 122, 120 and 124 takes the signal from 30-34 kHz band down to baseband. The output of the detector 126 is input to the telephone microcontroller 104. As one skilled in the art will appreciate, these functions could all be integrated into one or a few devices. They are illustrated here as discrete devices to provide clarity.

Figure 4:
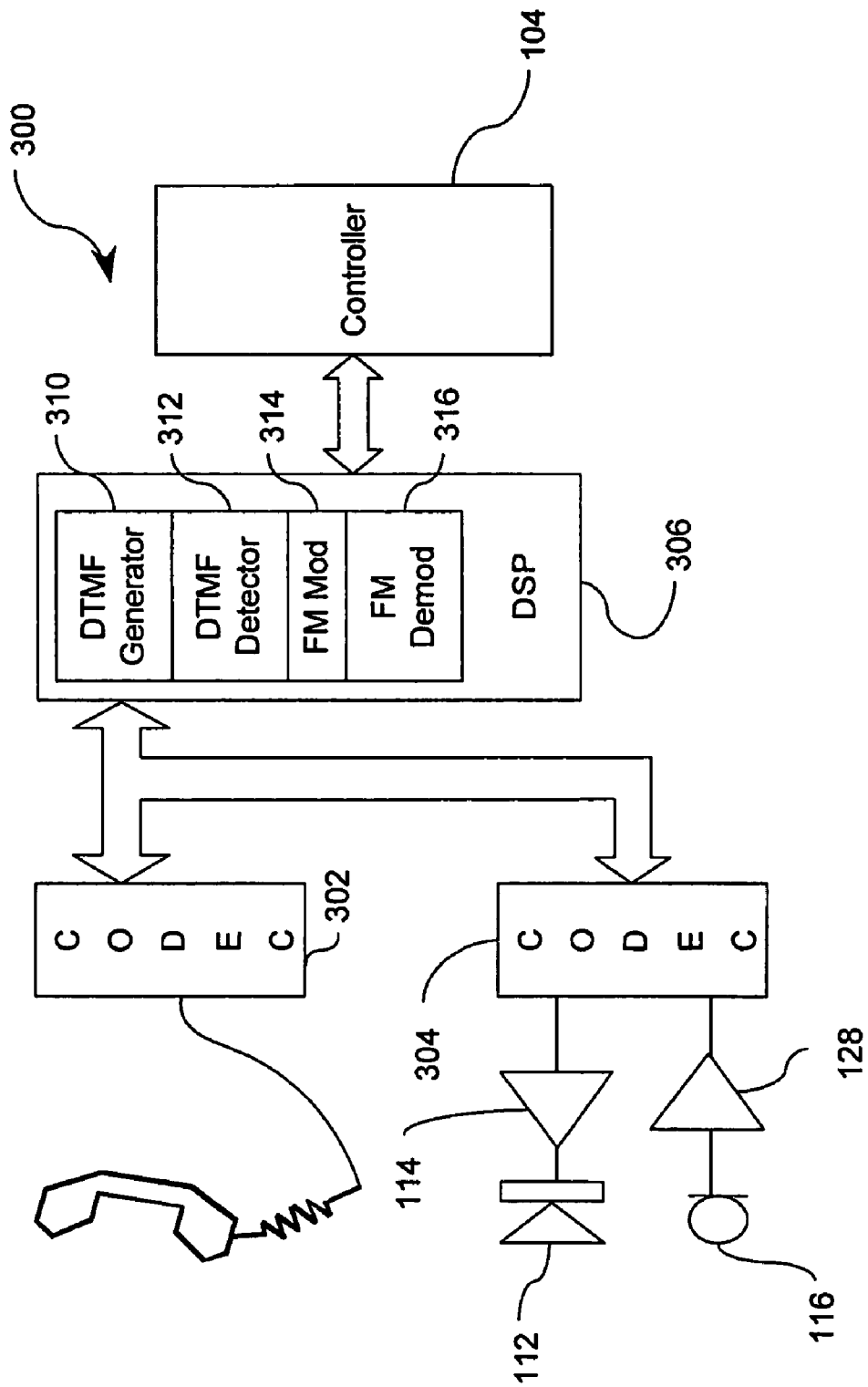

FIG. 4 is a block diagram of a speakerphone 300 according to an embodiment of the present invention. Standard components of speakerphone 300 include microcontroller 104, handset CODEC 302, handset 304, and digital signal processor (DSP) 306. Other previously described components include loudspeaker 112, power amplifier 114, microphone 116 and amplifier 128. Although not shown in FIG. 3, components such as the display and keyboard user interfaces would be understood to be included as part of the speakerphone 300. In particular, FIG. 4 illustrates a digital implementation of the ultra-sound processing circuit 100. The embodiment of the invention shown in FIG. 4 uses a high speed codec 308. In this instance the signal generation, detection and control is all performed in the digital domain of DSP 306. For example, the DTMF generator 102 and the DTMF detector 126 of FIG. 3 can be executed digitally within DSP 306 as functional blocks 310 and 312 respectively. Additional signal processing can be provided by FM modulator 314 and FM Demodulator 316, that perform analogous functions to the upconverting circuits, downconverting circuits, and filters used in FIG. 3. Current technology makes this easily feasible with sampling rates of 96 kHz or more and current digital signal processors.

While example speakerphone implementations of the present invention are shown in FIG. 3 and FIG. 4, the ultra-sound processing circuit 100 can be implemented in any audio/visual device.

With the ultra-sound processing circuit 100, any audio/video device can be programmed to operate in accordance with an integration protocol. The integration protocol allows for audio/video devices within a room to identify themselves with each other, and to integrate them into an ad-hoc audio/ video conferencing network. The protocol can be embodied as an application running either in the telephone, personal computer, portable computing device, or any device that is connected to the network. By example, a video conferencing unit can be programmed to "follow" the telephony call, thus easing set-up of a video conference operation, such as in Thompson et al. in United States Application No. 2001/0056466.

A general description of the integration protocol according to a preferred embodiment of the invention follows. A unique signature (signal) is broadcast by a device in a room. Other devices perceive this signal and respond. The first device in turn perceives this response and thus becomes aware of other device(s) and can modify its behaviour in consequence. Ideally, some common network (VoIP, EtherNet, ISDN, PSTN, etc.) interconnects these devices. In such a case the signal broadcast can not only identify the type of device but also it's own address (e.g. telephone number, IP address, M.A.C, etc.) so that the other devices know how to contact each other. This permits devices that share a data protocol to further enhance their co-operative behavior.

A practical execution example of the integration protocol follows with reference to the office environment of FIG. 1. As previously described, the office can include a speakerphone 11, an audio conference unit 12, a video conferencing unit 18, and a personal computer 13 with a mounted video camera 14, and other associated peripheral devices (15, 16 and 17). The speakerphone 11 is at the desk, the audio conferencing unit 12 is at the side table. The personal computer 13 has a video camera 14 for personal video-conferencing and there is a video-conferencing unit 18 for larger meetings. Typically, these devices all operate independently but share the same common network, such as an EtherNet (IP) network.

A telephone call is first placed to a device (far end). Once this audio call is established, the user is offered a choice to activate the other audio devices (in this case the audio-conferencing unit). If the user chooses to activate these devices, they can work together to maximize the audio quality. If the called party (far end) has video conferencing or data capabilities and this is made known to the calling party (near end), then the user (at the near end) is automatically given the choice to enable the video and data capabilities available at the near end. This can include the PC video camera and display or the video conferencing unit or both in this scenario. If the far end cannot automatically signal the presence of their video conferencing capabilities or data sharing, then this information can be relayed to the calling party who can manually input the far end data and have the choices available within the near-end room. If more than one video or audio conferencing system are enable within the same room they are aware of each others existence, and if so enabled, would be capable of co-operatively operating to enhancing overall quality of the conference call. Audio devices can also contribute positively to the enhancement of the video operation with appropriate data fusion schemes, as disclosed in Schulz et al. in United States Application No. 2005/0140779.

The detailed protocol according to a preferred embodiment will now be explained. This illustrates one possible protocol and variants of this protocol are possible. Likely, devices incorporating the embodiments of the ultra-sound processing circuit 100 can use a standardized protocol. Upon power up, a device starts monitoring the signal space of interest, such as the 30-34 kHz range for example. It waits for a predetermined period of 30 seconds to see if any signal is present. If no signal is detected this means that it is the only device with this feature within the room. The device becomes automatically the "master". This "master" now emits a burst of signal periodically, such as every 15 seconds for example, starting randomly 0-20 s after the 30 s silence (in case several are powered on simultaneously) and waits for a response. It is noted that the time periods recited above are exemplary, and any time can be selected in alternate embodiments.

Once a second device is activated within the same room it starts by listening for a signal. Once a signal is detected it responds with a short fixed delay, of 100 ms for example, by emitting its own signal. The "master" now recognizes that there is a second device within the space. Generally, the presence of the second device is registered or stored in a list stored in memory of the master device. In the simplest scheme, the protocol ends here. In a more complex scheme the "master" requests the "slave" to provide its network address by providing its own network address. This exchange of information is conducted in the ultra-sound domain, and both the master and the second device can register/store the received information in their respective memories. Those of skill in the art will understand that the received information can be stored in the embedded memory of the microcontroller, or in a discrete memory device. Once the devices have established mutual network communication the "master" returns to its periodic "identify" symbol and the "slave" provides a symbol corresponding to its order (first slave) followed by a period of silence, such as 15 s for example.

If a third (and subsequent) device is activated it also starts by listening and waits to obtain the "identify" signal and the "slave" signals. It waits for 5 s of silence then responds with its own signal. The "master" and all the existing "slaves" capture this signal and thus become aware that there is a yet another device to be joined to the ad-hoc conference network. Again, in the simplest scheme, this is all that is performed and the "master" returns to the "identify" signal followed by the "slave" signals. In the more complex scheme, the "master" again responds with its network address. The new device responds with its network address, the second last discovered device follows, and so on until the first "slave" has finally done so. The newest device thus knows where to find the "master" and all the other "slaves" as well as knowing who they are and their address. Once the devices have established mutual network communication the "master" returns to its periodic "identify" symbol and the "slaves" provide a symbol corresponding to their order.

If one of the "slaves" fails to respond then the "master" recognizes this and emits a renumber symbol. Failure can be due to device de-activation or removal of the device from the room. The devices that have yet to broadcast decrement their order by one and once the "master" restarts the "identify" symbol they keep on going. All of the devices thus know which device is no longer active and can thus modify their behaviour appropriately. The conference call using all the devices identified in the ad-hoc network can begin once the user elects to do so.

The protocol can to include a collision avoidance scheme. If there should be two devices that start broadcasting simultaneously, the collision avoidance scheme proceeds as follows. All are silent for a period of time, such as 15 s for example. Then each of the colliding devices tries again with a randomly chosen delay of between 0 to 15 seconds. A collision event can be detected when the DTMF detector of the master device fails to recognize or properly decode the incoming data. Then the colliding devices which do not receive any request for their network address from the master device can re-emit at the random time delay.

It should be noted that the network addresses exchanged do not necessarily have to be from a homogeneous network, meaning that the aforementioned embodiments of the present invention are network independent. For example, the personal computer can have an IP address, the telephone could be a telephone number (as it could be VoIP, ISDN, DSL or such device), the audio conferencing unit could be a wireless device such as DECT, etc. The conferencing operation will proceed as long as it is possible to somehow establish some intercommunication between all devices, even in a mixed network. In a preferred embodiment, the telephone is VoIP and can have a wireless link (e.g. DECT), a PSTN connection and thus a telephone number to an IP address converter, as well as any other required links.

The goal of the previously described embodiments is to integrate multiple devices into an audio/video conference call network to improve the quality of the conference call function. The audio/video conference call is an example of a preferred co-operative application of the ad-hoc networked system. Any similar co-operative application can also benefit from the embodiments of the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for wirelessly detecting a second device with a first device in a room, comprising:
   a) emitting a signal confined to the room from the first device;
   b) receiving a reply signal confined to the room from the second device in response to the emitted signal;
   c) registering the second device in response to receiving the reply signal from the first device; and
   d) requesting a network address of the second device by the first device.

2. The method of claim 1, further including a step of monitoring the room for a predetermined period of time before the step of emitting.

3. The method of claim 1, wherein the step of emitting includes emitting the signal at regular intervals.

4. The method of claim 1, wherein the step of receiving includes detecting the signal by the second device.

5. The method of claim 4, wherein the second device emits the replay at delayed time after detecting the signal.

6. The method of claim 5, wherein a third device emits a second reply at the delayed time after detecting the signal.

7. The method of claim 6, further including a step of detecting a collision between the second device and the third device.

8. The method of claim 7, wherein the second device and the third device reply at randomly determined delayed times in response to detection of the collision.

9. The method of claim 1, wherein the signal and the reply signal are ultra-sound signals.

10. The method of claim 9, wherein of the ultra-sound signals are generated in a 30-34 Hz frequency range.

11. The method of claim 1, wherein the signal and the reply signal are infrared signals.

12. The method of claim 1, further including emitting the network address by the second device in response to tile step of requesting.

13. The method of claim 12, wherein the step of requesting the network address includes emitting an address request signal confined to the room by the first device, and the step of emitting the network address includes emitting an address signal confined to the room by the second device.

14. The method of claim 1, wherein the step of receiving includes receiving a second reply signal from a third device.

15. The method of claim 14, wherein the reply signal includes a symbol corresponding to an order of the second device and the second reply signal includes a second symbol corresponding to an order of the third device relative to the second device.

16. The method of claim 15, wherein the third device provides the symbol corresponding to the order of the second device when the second device is removed form the room or deactivated.

17. The method of claim 14, wherein the second reply signal includes a second network address corresponding to the third device.

18. The method of claim 17, wherein the second network address is received by the at least one device.

19. The method of claim 18, further including a step of establishing network communication between the first device, the second device, and the third device.

20. A method for wirelessly detecting a second device with a first device in a room, comprising:
   a) emitting a signal confined to the room from the first device;
   b) receiving a reply signal confined to the room from the second device in response to the emitted signal, the reply signal includes a network address corresponding to the second device; and,
   c) registering the second device in response to receiving the reply signal from the first device.

21. The method of claim 20, further including a step of establishing network communication between the first device and the second device.

* * * * *